(12) United States Patent  
Lu

(10) Patent No.: US 9,596,826 B2
(45) Date of Patent: Mar. 21, 2017

(54) COLLAPSIBLE AND PORTABLE PET CRATE

(71) Applicant: Kongzhi Lu, Xiamen (CN)

(72) Inventor: Kongzhi Lu, Xiamen (CN)

(73) Assignee: Xiamen Sunnypet Products Co., Ltd., Xiamen (CN)

( * ) Notice: Subject to any disclaimer, the term of this patent is extended or adjusted under 35 U.S.C. 154(b) by 0 days.

(21) Appl. No.: 14/443,942

(22) PCT Filed: Jan. 15, 2013

(86) PCT No.: PCT/CN2013/070446
§ 371 (c)(1),
(2) Date: May 19, 2015

(87) PCT Pub. No.: WO2014/089923
PCT Pub. Date: Jun. 19, 2014

(65) Prior Publication Data
US 2015/0305296 A1  Oct. 29, 2015

(30) Foreign Application Priority Data

Dec. 11, 2012  (CN) .......................... 2012 1 0530429

(51) Int. Cl.
*A01K 1/03* (2006.01)
*A01K 1/00* (2006.01)
*A01K 1/02* (2006.01)

(52) U.S. Cl.
CPC .......... *A01K 1/0035* (2013.01); *A01K 1/0245* (2013.01); *A01K 1/0254* (2013.01); *A01K 1/033* (2013.01)

(58) Field of Classification Search
CPC .. A01K 1/0035; A01K 1/0254; A01K 1/0245; A01K 1/033; A01K 1/03; A01K 1/0236; A01K 1/029; A01K 31/002; A01K 31/007; A01K 31/08; A01K 1/0272; A01K 1/034; A45C 9/00; A45F 4/02
(Continued)

(56) References Cited

U.S. PATENT DOCUMENTS 3,994,372 A * 11/1976 Geller ................... A47D 15/003
   190/107
5,615,640 A *  4/1997 Luiz .......................... A01K 1/03
   119/482
(Continued)

FOREIGN PATENT DOCUMENTS

CN      2862674 Y  *  1/2007  ............... A01K 1/00
CN    201905115 U  *  7/2011  ............... A01K 1/00

*Primary Examiner* — Jennifer E Novosad
(74) *Attorney, Agent, or Firm* — Jen-Feng Lee, Esq.

(57) ABSTRACT

A pet house or a pet crate is easily collapsible, foldable and portable, having four side walls, connected to a roof plate, with a frame support built to the edges of the left and right side walls, when two first zippers zip up along the left and right side walls' edges to form the complete and assembled pet crate. A special 180-degree flip of a second zipper strip is made to the portion along the edges of the roof plate, so that the orientation of the zipper teeth at the portion connected to the roof plate is reversed in direction to the portion connected to the front and back side walls, providing a stronger propping power for the corners under the roof plate, when zipped up and fully erected.

9 Claims, 5 Drawing Sheets

(58) Field of Classification Search
USPC ....... 119/461, 474, 491, 498, 499, 416, 482, 119/496, 497, 452, 28.5, 453, 500, 501; D30/108, 118, 109, 114; D32/36; 135/126, 125, 128; 220/9.1, 9.4, 4.33, 6, 220/7; 383/4, 121.1, 110, 106, 40, 104, 383/33, 12, 117
See application file for complete search history.

(56) References Cited

U.S. PATENT DOCUMENTS

| | | | | |
|---|---|---|---|---|
| 6,076,485 A * | 6/2000 | Peeples | ............... | A01K 1/0254 119/496 |
| 6,095,090 A * | 8/2000 | Burns | ............... | A01K 1/0254 119/497 |
| 6,193,034 B1 * | 2/2001 | Fournier | ............... | A45C 7/0095 190/107 |
| 6,276,298 B1 * | 8/2001 | Welsh | ............... | A01K 39/0113 119/52.3 |
| 6,499,496 B1 * | 12/2002 | Young | ............... | E04H 15/04 135/117 |
| D551,810 S * | 9/2007 | Yeung | ............... | D30/108 |
| 7,617,797 B2 * | 11/2009 | Lam | ............... | A01K 1/0245 119/28.5 |
| 2002/0000241 A1 * | 1/2002 | Lee | ............... | E04H 15/425 135/156 |
| 2003/0042160 A1 * | 3/2003 | Godshaw | ............... | A45C 7/0095 206/349 |
| 2003/0089316 A1 * | 5/2003 | Chou | ............... | A01K 1/033 119/497 |
| 2003/0127060 A1 * | 7/2003 | Yeung | ............... | A01K 1/0254 119/497 |
| 2004/0194723 A1 * | 10/2004 | Farmer | ............... | A01K 1/0254 119/474 |
| 2005/0132972 A1 * | 6/2005 | Scott | ............... | A01K 31/14 119/431 |
| 2006/0266603 A1 * | 11/2006 | Godshaw | ............... | A45C 3/004 190/108 |
| 2007/0095298 A1 * | 5/2007 | Whitlock | ............... | A01K 31/14 119/431 |
| 2007/0193522 A1 * | 8/2007 | Greschler | ............... | A01K 1/033 119/28.5 |
| 2008/0072837 A1 * | 3/2008 | Redzisz | ............... | A01K 1/0254 119/474 |
| 2009/0101075 A1 * | 4/2009 | Matlack | ............... | A01K 1/0254 119/497 |
| 2010/0089331 A1 * | 4/2010 | Scott | ............... | A01K 5/01 119/61.1 |
| 2010/0126427 A1 * | 5/2010 | McGrade | ............... | A01K 1/0254 119/496 |
| 2010/0258059 A1 * | 10/2010 | Lott | ............... | A01K 1/0245 119/499 |
| 2010/0282179 A1 * | 11/2010 | Ho | ............... | A01K 31/06 119/455 |
| 2011/0017145 A1 * | 1/2011 | Northrop | ............... | A01K 1/0254 119/497 |
| 2011/0197822 A1 * | 8/2011 | Chou | ............... | A01K 1/0254 119/496 |
| 2011/0203528 A1 * | 8/2011 | Northrop | ............... | A01K 1/033 119/497 |
| 2012/0186533 A1 * | 7/2012 | Lu | ............... | A01K 1/0254 119/497 |
| 2014/0116348 A1 * | 5/2014 | Kwok | ............... | A01K 1/0254 119/497 |
| 2015/0047574 A1 * | 2/2015 | Jakubowski | ............... | A01K 1/0254 119/499 |
| 2015/0305296 A1 * | 10/2015 | Lu | ............... | A01K 1/033 119/499 |

* cited by examiner

US 9,596,826 B2

COLLAPSIBLE AND PORTABLE PET CRATE

PRIORITY CLAIM TO PCT APPLICATION

Applicant hereby makes priority claim to the PCT application number PCT/CN2013/070446, having the international filing date of Jan. 15, 2013, which claimed the priority filing in China, application number 201210530429.2, dated Dec. 11, 2012.

FIELD AND BACKGROUND OF THE INVENTION

Collapsible and portable pet carriers or crates have been around for some time. When larger amount of space is needed inside the pet crate to give pets roomier place for resting and more comfortable posture, the use of rigid frame or rods to form the supporting structure is unavoidable, which results in less flexibility in the collapsible folding feature.

Other traditional pet crates or pet houses are made with heavier materials for increased strength. However, the down side becomes pretty obvious when the weight of the materials reduces the portability of the pet houses.

Also, there are some zipper-based collapsible pet houses or pet crates on the market. However, the use of the zippers in the current art products are the typical two zipper strips with teeth facing each other: one is facing inward and one is facing outward. It is observed that the corners of such zipped up pet houses tend to cave in easily, as there is not enough tension being maintained by such traditional zipping mechanism.

SUMMARY OF THE INVENTION

The invention relates to the construction of a pet house that can be easily set up, and to provide good structural strength without adding too much weight.

The invention further provides an easy fold-down pet house that will become a flat piece when collapsed.

The invention further disclosed a 180-degree turn zipper strip that creates stronger corner propping power that avoids the cave-in problems associated with many old-art zipper type pet housing or crates.

The use of ballast chambers also provides an easy way to increase the stability of the assembled and fully erected pet house when used in open or windy area, or when animal frolicking or horse play could pose an issue of knocking down the pet house.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

CALL OUT LIST OF ELEMENTS

Figure 1:
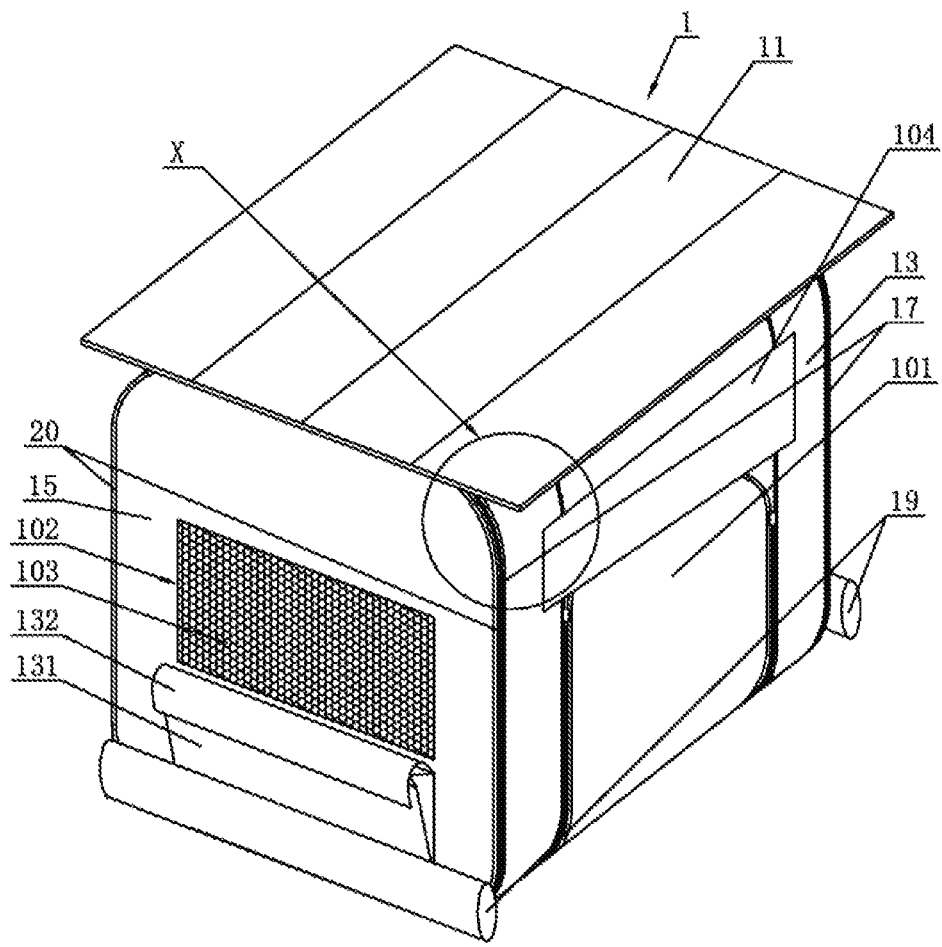
FIG. 1 shows the completely assembled view of the pet crate of the present invention, with the front side wall and left side wall facing the viewers.

1 Pet crate/pet house
11 roof plate
12 baseplate
13 front side wall
14 backside wall
15 left side wall
16 right sidewall
17 two first zippers
17a strip a
17b strip b
18 second zipper
19 ballast chamber
20 support frame
101 door
102 window mesh
103 mesh material
104 curtain
120 padding
131 pocket
132 pocket cover

DETAILED DESCRIPTION OF THE PREFERRED EMBODIMENT

As shown in the figures, the foldable and collapsible pet crate 1 of present invention has a roof plate 11, a generally rectangular base plate 12 and four side wall pieces.

The 4 side walls are front side wall 13, back side wall 14, left side wall 15, and right side wall 16. The front side wall piece 13 and back side wall piece 14 are generally rectangular.

The orientation of front, back, left and right will be from the perspective of looking at front side wall 13 squarely, so that left side wall 15 is to the left side, as shown in FIG. 1, and right side wall 16 is to the right side, which is invisible in FIG. 1.

Figure 2:
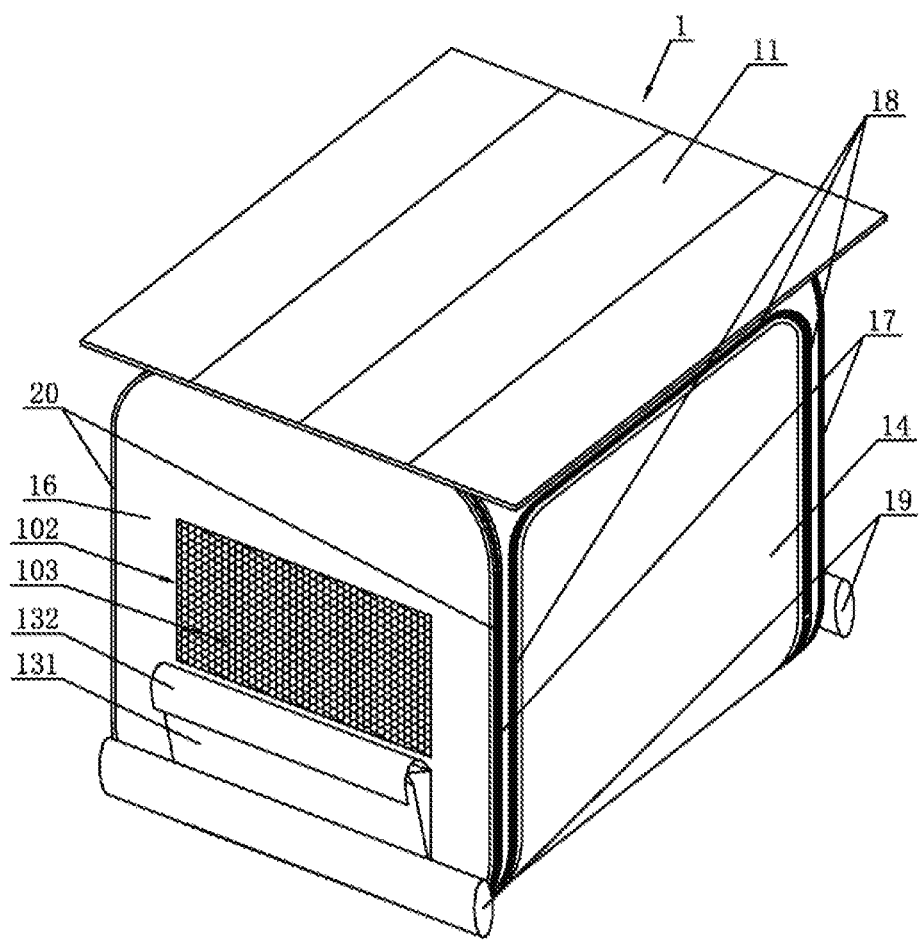
FIG. 2 shows the completely assembled view the pet crate of the present invention, with the back side wall and the right side wall facing the viewers.
Figure 4:
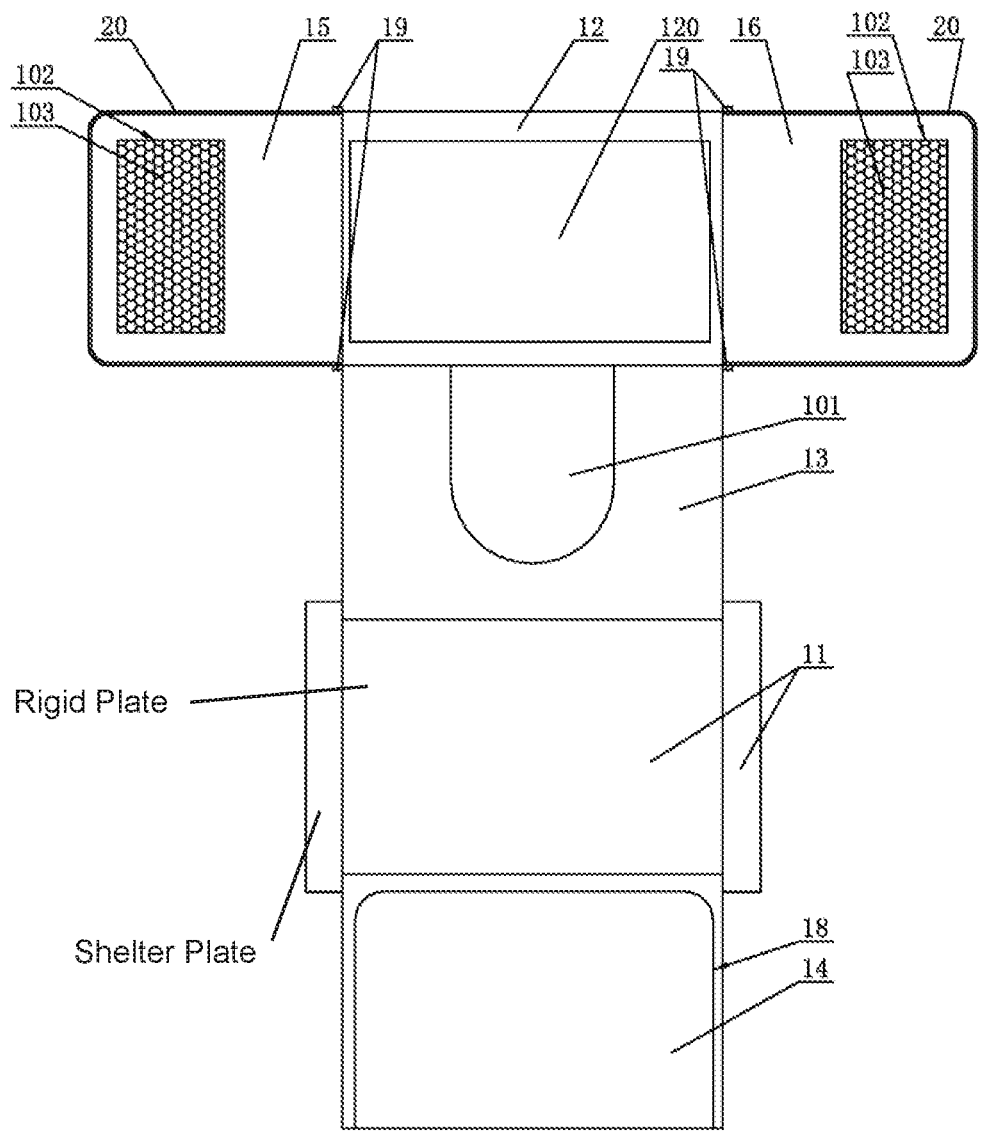
FIG. 4 shows the pet crate of the present invention, when collapsed and unfolded flat, in an expanded fashion.

The side walls 13, 15 and 16 are directly connected to the base plate 12, with the back side wall 14 connected to the roof plate 11 when collapsed and flattened, as shown in FIG. 4. The back side wall 14 will be connected to the base plate 12 when the pet crate is assembled and erected for use, as shown in FIGS. 1 and 2.

Although the preferred embodiment showed these side walls pieces to be in generally rectangular shape, they are not limited to that shape. For example, the right side wall 16 and left side wall 15 can be 5-sided, as long as they fit to a matching shape of the roof plate 11 which would have a bent angle in the middle, and allow the crate to be fully zipped up and erected for use.

A support frame 20 is built to the edge of left side wall 15 and right side wall 16.

Two first zippers 17 will connect the front side wall 13, roof plate 11 and back side wall 14 together with the left side wall 15 and the right side wall 16, to form an assembled and fully erected pet crate 1.

The left side wall 15 and right side wall 16 each has a first zipper 17. The function and description for the two zippers 17 will be the same. First zipper 17 is made up of two strips for zipping together. Strip 17*a* is made to the edge of left side wall 15, and similarly, to the edge of right side wall 16.

Looking at FIG. 4, Strip 17*b* is made to the left (connected) edges of the front side wall 13, roof plate 11 and back side wall 14. Similarly, another corresponding strip 17*b* is made to the right (connected) edges of the front side wall 13, roof plate 11 and back side wall 14.

When affixing a strip 17*a* to the edge of left side wall 15, the zipper teeth is oriented to face inwardly.

When affixing a strip 17*a* to the edge of right side wall 16, the zipper teeth is oriented to face inwardly.

Figure 5:
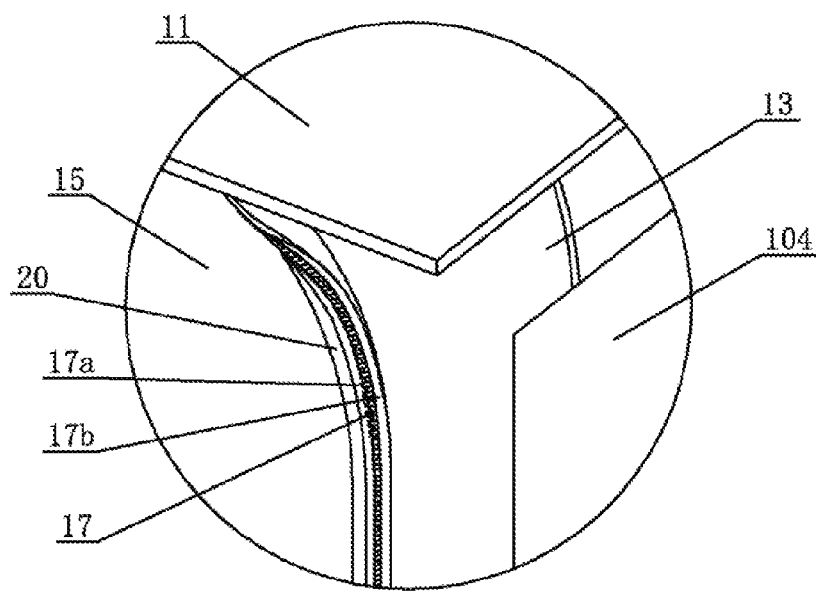
FIG. 5 is a partial exploded view of the top corner area under the roof, as depicted in FIG. 1, marked by an X.
Figure 6:
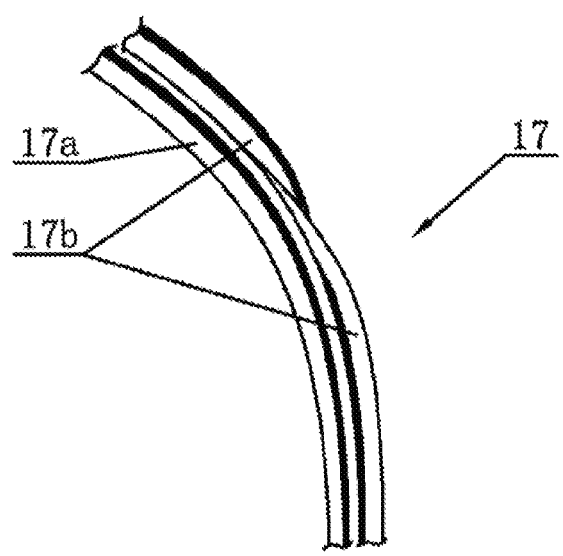
FIG. 6 shows the 180 degree flip of the zipper strip 17b.

The strip 17*b* is fixed to the connected edges (looking at FIG. 4) of the front side wall 13, the roof plate 11 and the back side wall 14 in a special way. The zipper teeth of strip 17*b* is oriented outwardly along the edges of the front side wall 13 and back side wall 14, but is turned 180 degrees to be oriented inwardly along the edges of the roof plate 11. This special 180-degree flip of the zipper teeth orientation is shown in FIGS. 5-6.

This 180-degree flip feature of the strip 17*b* increases the strength at the top four corners just under the roof plate 11 when the crate 1 is fully assembled, and helps to reduce the tendency of roof plate 11 caving in that happens more with the traditional zipper mechanism, especially at the four corners on top that supports the roof plate 11.

Figure 3:
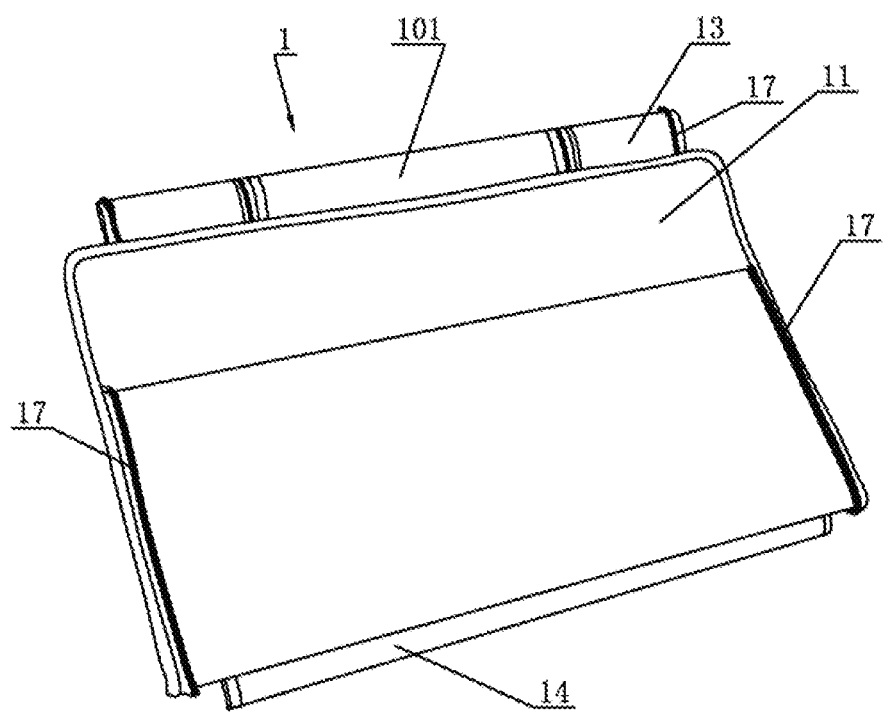
FIG. 3 shows the pet crate of the present invention, when collapsed down and folded flat.

To collapse and fold down the pet crate 1 of present invention is relatively easy as well. When the two first zippers 17 were fully unzipped on both left and right sides along the full length of the edges of left side wall 15 and right side wall 16, the crate 1 can be collapsed down and spread out to be in a flat configuration, and then be folded into a shape that takes up very small area, as shown in FIG. 3 and FIG. 4.

A second zipper 18 is made to the back side wall 14. An inversed U-shape zipping line is formed for the zipper 18, so that back side wall 14 can be zipped opened down to be lying flat on a surface, resulting in a big opening as defined by the line of the zipper 18.

The opening made from the zipper 18 opening is bigger than the opening of the door 101. This mode of opening back side wall 14, via separate zipper 18, produces a semi-open pet house or pet crate that is especially suitable for pets with larger bodies, or when easy access to outdoor space is desired.

A door 101 is made on front side wall 13. No particular mechanism is needed to be disclosed here for providing the opening mechanism as this is well known in the art. A zipper can be used, so is a Velcro® strip. Additionally, a curtain 104 is made just above the door 101, providing some shade and heat-deflection.

A window 102 is provided on the left side wall 15; a mesh material 103 is optionally used on the window 102. Though the specification herein, as well as FIG. 1, shows the window 102 to be on the left side wall 15, it is understood that a person reasonably skilled in the art needs no further disclosure to make the window/mesh (102/103) on the right side wall 16.

Two ballast chambers 19 are made to the bottom portion of left side wall 15 and right side wall 16. The ballast chambers 19 can be filled with water, sand or other suitable weighting materials, to weigh down the pet crate 1, when placed in an outdoor and potentially windy setting. Such ballast chambers 19 also prevent easy knocking over by the horse play or frolicking of animals or pets nearby.

A padding 120 is provided to the base plate 12, to increase the comfort level of the pets when sitting or resting on top of base plate 12. Said padding 120 can have a two-layer fold-up design, so that when it's folded up, the two layers take up roughly the same area as the base plate 12. When it's unfolded, the single-layer area would cover roughly the area of the base plate 12 and back side wall 14, suitable for when the back side wall 14 is zipped down flat, forming a semi-open pet crate or pet house 1.

Roof plate 11 serves the purpose of providing a shelter from the sun or the rain. Two specific implementations are discussed herein.

The first roof plate 11 implementation is a generally rigid plate with good water-proofing and UV-resistance attributes.

The second roof plate 11 implementation contains an additional shelter plate attached to the top of the rigid plate, said additional shelter plate has an area that's larger than the area of the rigid plate. This additional shelter plate implementation can be seen in FIG. 4, though only a single element number 11 is used to denote the rigid plate, as well as the shelter plate.

The attachment of the additional shelter plate to the rigid plate can be by Velco®, glue, or other suitable mechanism.

A pocket 131 can be added to left side wall 15 or right side wall 16, to increase the convenience for the access and storage of pet snacks, medication, etc. A pocket cover 132 sits slightly on top of said side pocket 131, to cover up the opening and preventing things or objects from falling out. The pocket 131 and pocket cover can also be made to the front side wall 13, if so desired.

As a design option, the left side wall and right side wall can be made into corresponding pentagon shape, and the roof plate will be made into a bent shape to match the pentagon shape of the two side walls 13 and 14.

The invention claimed is:

1. A collapsible and portable pet crate, comprising:
a generally rectangular base plate;
a generally rectangular front side wall;
a generally rectangular back side wall;
a generally rectangular roof plate;
a left side wall having a left side wall left side edge and a left side wall right side edge and a right side wall having a right side wall left side edge and a right side wall right side edge, wherein each of the sidewalls is connected to the base plate at a bottom of the left side wall and the right side wall, said left side wall and right side wall each containing a support frame that is built along the left side wall left side edge, the left side wall right side edge, the right side wall left side edge, and the right side wall right side edge; and
two zippers, each of which zips up the front side wall, the roof plate and back side wall along the edge of the respective left or right side walls, wherein the two zippers are connected to the front sidewall, the roof plate, the back side wall, the left side wall and the right sidewall, wherein each of the two zippers contain two corresponding zipper strips, a first one of the two zipper strips being on an edge of the left side wall and the right side wall and a second one of the two zipper strips being on edges of the front side wall, the roof plate and the back side wall, so that the first zipper strip has its zipper teeth oriented inwardly, and the second zipper strip has its zipper teeth oriented outwardly along the edges of the front side wall and back side wall, and wherein the zipper teeth are turned 180 degrees to be oriented inwardly along the edges of the roof plate, to provide a 180-degree flipped zipper teeth orientation.

2. The pet crate of claim 1, wherein the front side wall further has a door, with a stowable curtain on top of the door.

3. The pet crate of claim 1, wherein either one of the left side wall and right side wall further has a window.

4. The pet crate of claim 1, wherein two ballast chambers are formed on a bottom portion of left side wall and right side wall.

5. The pet crate of claim 1, wherein the back side wall contains a second zipper defining an inverted U-shaped opening to be made and opened down to be lying flat on a surface.

6. The pet crate of claim 1, wherein the base plate further comprises a padding that is folded into a two-layer design or unfolded into a single-layer design.

7. The pet crate of claim 1, wherein the roof plate is a generally rigid plate with water-proof and UV-resistance.

8. The pet crate of claim 1, wherein the roof plate contains an additional shelter plate attached to the top of a rigid plate, said additional shelter plate has an area that is larger than the area of the rigid plate.

9. The pet crate of claim 1, wherein a pocket with a pocket cover is added to the front side wall, left side wall, or the right side wall.

\* \* \* \* \*